June 15, 1965 D. L. MONSON 3,189,318
FAUCET AND VALVE STRUCTURE THEREFOR
Filed April 24, 1962 3 Sheets-Sheet 1
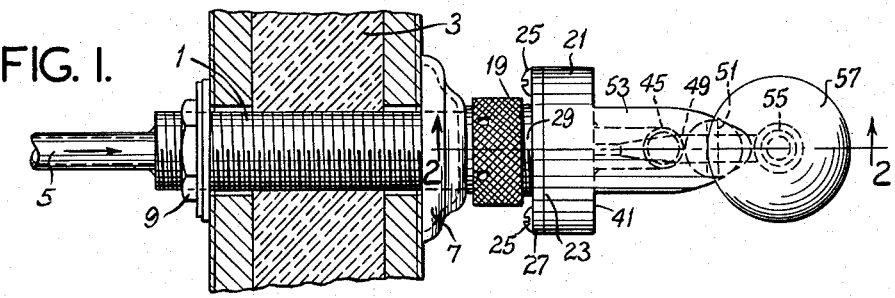
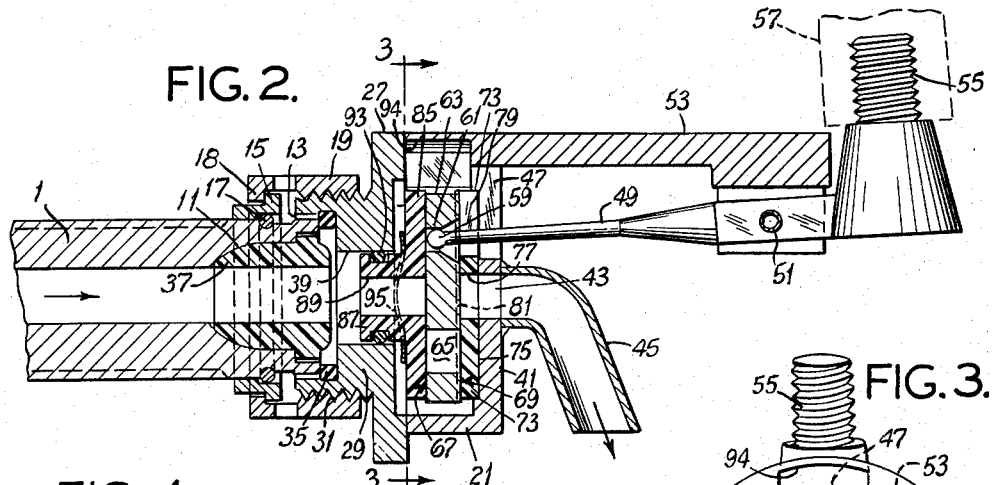
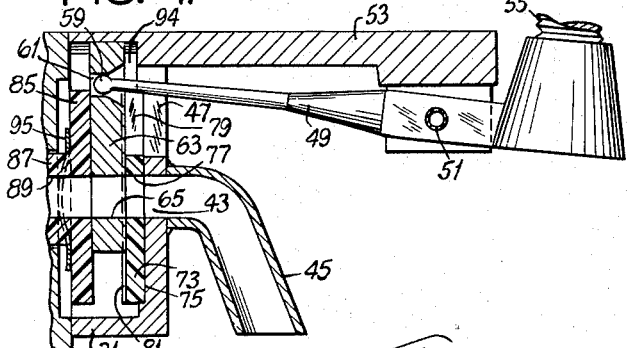
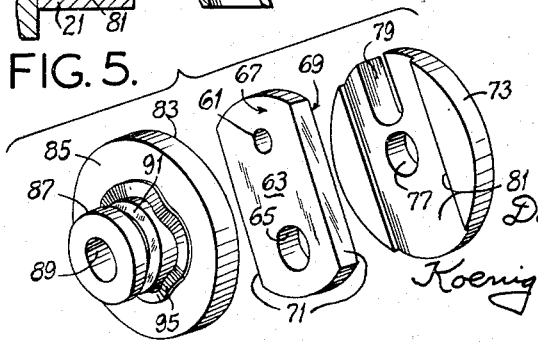
Donald Lee Monson,
Inventor.
Koenig, Pope, Senniger and Powers,
Attorneys.

June 15, 1965  D. L. MONSON  3,189,318
FAUCET AND VALVE STRUCTURE THEREFOR
Filed April 24, 1962  3 Sheets-Sheet 2
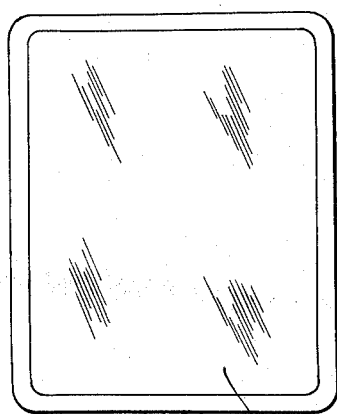
FIG. 6.
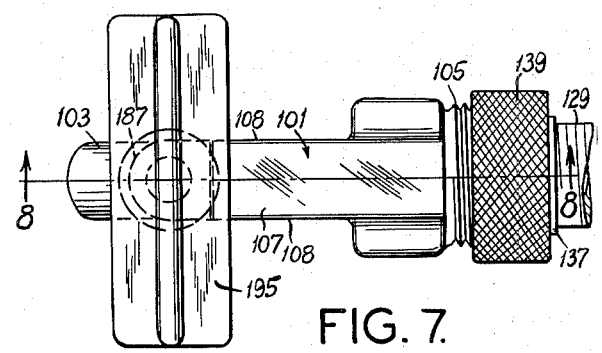
FIG. 7.
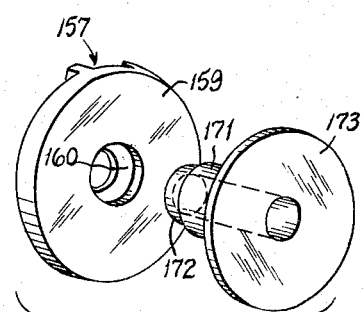
FIG. 14.
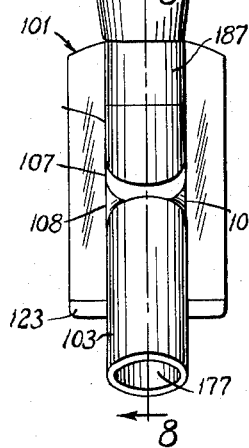
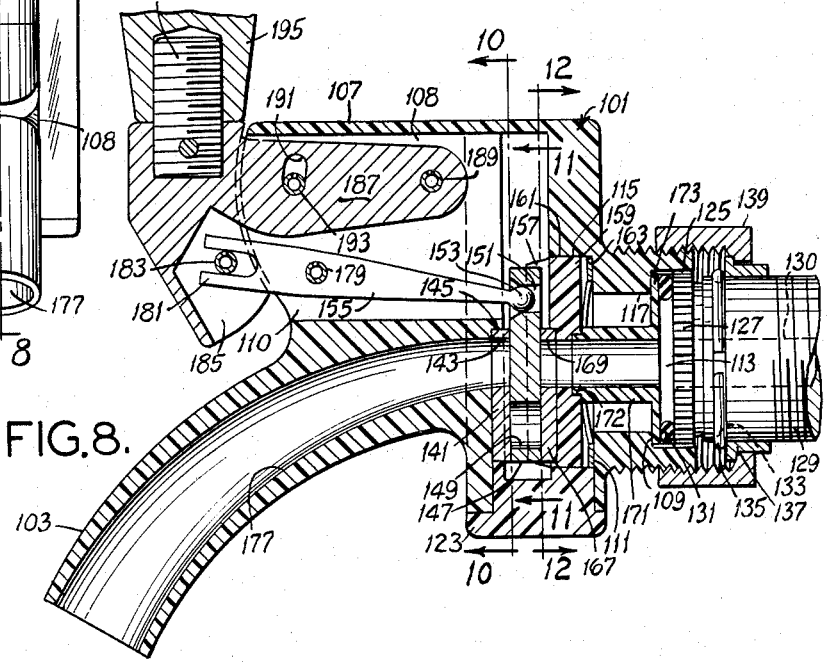
FIG. 8.

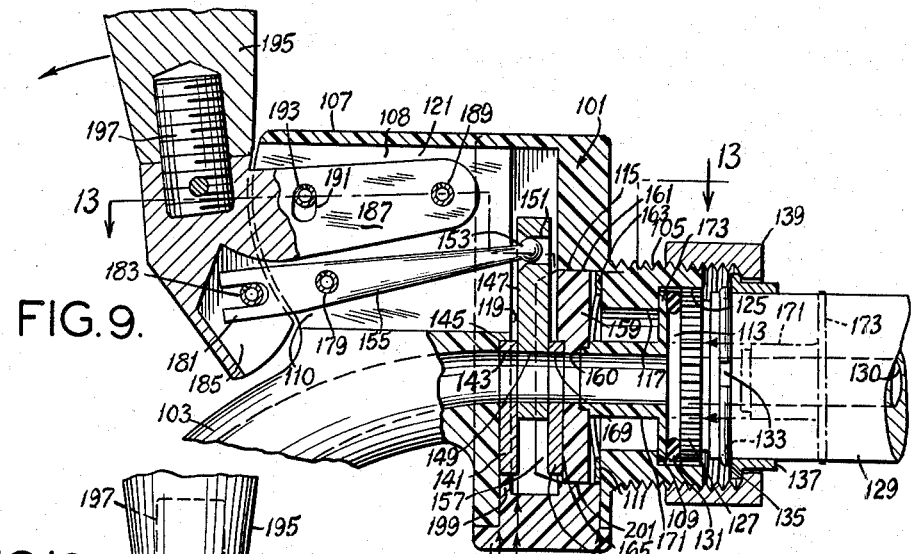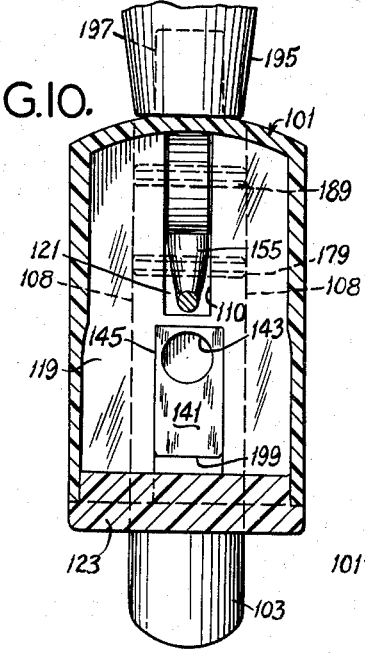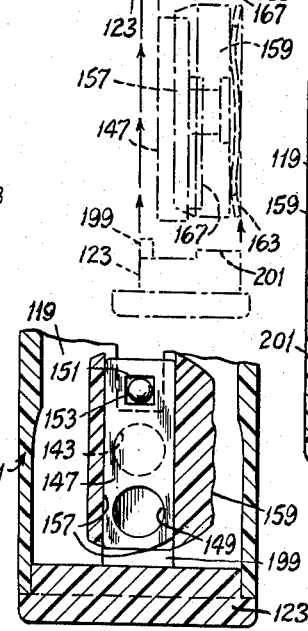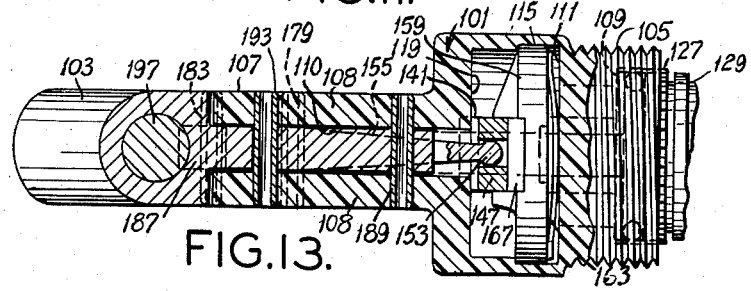

United States Patent Office 3,189,318
Patented June 15, 1965

3,189,318
FAUCET AND VALVE STRUCTURE THEREFOR
Donald Lee Monson, Kenosha, Wis., assignor to Monson Research Company, Inc., Kenosha, Wis., a corporation of Wisconsin
Filed Apr. 24, 1962, Ser. No. 191,675
7 Claims. (Cl. 251—174)

This invention relates to faucets and valve structures therefor, for such items as sanitary faucets for dispensing carbonated beverages and other fluids difficult to dispense.

This application is a continuation-in-part of my United States patent application Serial No. 106,846, filed May 1, 1961, for Valve for Faucets and the Like, now abandoned.

Among the several objects of the invention may be noted the provision of a short-movement, quick-acting, nonsticking valve adapted for rapid opening with resulting instantaneous start of a free flow, and for rapid cut-off upon closure; the provision of a valve of the class described which when used in dispensing faucets improvedly controls efflux of foaming carbonated beverages such as beer; the provision of a valve of the class described which minimizes septic conditions and the need for complex disassembly operations for cleaning purposes; the provision of a strong but easily operable, self-aligning and trouble-free valve of this class; and the provision of an improved faucet employing such a valve. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, FIG. 1 is a plan view, partly in section, illustrating at the left outlet means for interchangeably connecting prior faucets and faucets made according to the invention, one of the latter being shown at the right;

FIG. 2 is an enlarged axial section taken on line 2—2 of FIG. 1, showing a closed condition;

FIG. 3 is a cross section taken on line 3—3 of FIG. 2;

FIG. 4 is a fragmentary view similar to FIG. 2, showing open conditions;

FIG. 5 is an exploded isometric view of a valve-seat assembly;

FIG. 6 is a front elevation of another form of the invention;

FIG. 7 is a top plan view of FIG. 6;

FIG. 8 is an enlarged longitudinal section taken on lines 8—8 of FIGS. 6 and 7, showing a closed position of parts;

FIG. 9 is a fragmentary view similar to FIG. 8, showing an alternative position of parts, pre-assembly positions of certain parts being shown by dot-dash lines;

FIGS. 10, 11 and 12 are cross sections taken on lines 10—10, 11—11 and 12—12, respectively, of FIG. 8;

FIG. 13 is a jogged horizontal section taken on line 13—13 of FIG. 9; and

FIG. 14 is a diagrammatic view showing certain normally connected parts in exploded relationship.

Corresponding reference characters indicate corresponding parts throughout the several views of the drawings.

Heretofore, valves such as used in beverage dispensing faucets and the like have employed poppet-type reciprocating valve spuds which upon opening action moved in and along the fluid stream. A spud or its seat carried a resilient sealing material. Such an arrangement had various disadvantages, particularly for use in faucets for dispensing foaming beverages such as beer. One of these disadvantages was caused by the internal space-forming flare that was required to accommodate spud movement. This flare stored a considerable amount of beer in a warm condition (outside of the refrigerator) which reacted with incoming cold beer when the valve was opened, and thus produced a considerable amount of uncontrollable foam. This undesirable foaming condition was aggravated by the need for the outgoing beer to flow around the spud head. Another disadvantage concerning the foaming action above described was the slow start of flow after valve opening, even with a comparatively long-throw valve operation. Moreover, the resulting foam was not of as desirable a character as that obtained when beer in a more liquid form descends from a faucet and strikes a receiving glass, it being preferable that the initial stimulation for forming come from contact with the glass, rather than by disturbing obstructions within the faucet. Such foam properly caps a drink, whereas that from the faucet does not. The obstruction formed by the spud also increased friction, which required higher and variable pressures for forcing different brands of beer through the faucet. In addition, beverages such as beer have a tendency to dry in and about faucet parts and to form solid bonds between seating parts, particularly when these contain relatively soft members at the seats. This characteristic has heretofore resulted in a high percentage of valve breakage, including packing damage, upon operation. Finally, the soft packing parts tended to deteriorate, which increased septic conditions and required frequent cleaning by disassembly.

Some former valves were made with slides between seats but were not satisfactory for controlling beverages such as beer, soda and the like because adequate arrangements were not provided for cleanliness.

Briefly, the present invention reduces movement required for opening and closing action by employing a cross slide arrangement between self-aligning hard seats. The relatively movable sealing surfaces do not separate upon opening and closing movements. This minimizes sticking and septic effects of any drying substance and results in easier and less destructive valve operation obtainable with a shorter operating stroke. As a result, there are required less frequent and elaborate cleaning procedures. The new arrangement also minimizes the need for the inlet space, which bought about undesirable internal foaming.

In one forming of the invention there is employed a sealed housing and permanently assembled parts therein so constructed that no disassembly of the faucet is required for cleaning during its life.

Referring now are particularly to the drawings, there is shown at numeral 1 an exteriorly threaded conventional outlet pipe passing through an insulated wall 3 of a conventional refrigerator. Attached to pipe 1 is a conventional pipe 5, which leads through the coolant in the refrigerator and carries the beverage (beer, for example). Conventional clamping means are shown at numerals 7 and 9 for rigidly supporting the outlet pipe 1 in the wall 3. The outer end of the pipe 1 is as usual provided with a socket-forming flare 11. The socket heretofore was empty and provided a flare for carrying the beer around the spuds of prior faucets (not shown) which were attached to the end of the pipe 1. This previously empty socket is that which heretofore pocketed warm beer and caused internal foaming when the prior faucet was opened. The socket is filled by a member 37, as will be described, to minimize inlet space.

The outside end of the pipe 1 (beyond the flare 11) is as usual provided with axial serrations 13, which engage with axial serrations on the threaded end of whatever faucet is used. The pipe 1 was also provided with a conventional shoulder-forming part 15, held in place by a snap ring 17, and engaged by an inwardly directed shoulder 18 of a threaded clamp ring 19 employed to draw the threaded ends of faucets into connecting position. The conjugate serrations of the faucet (old or new) interdigitate with the serrations 13 to prevent faucet rotation while the ring 19 is tightened. The faucet-supporting parts thus far described are old and the structure of the invention is adapted to cooperate therewith interchangeably with older faucets, if desired.

The new construction consists of a cup-shaped housing member 21 partially flanged as shown at 23. A rear cover plate 27 is attached by screws 25 to flange 23 of cup 21. Plate 27 carries a coupling boss 29, externally threaded as shown at 31 for threaded engagement with the clamp ring 19. The boss 29 is provided with internal axial serrations for engagement with the axial serrations 13 at the end of the pipe 1. A packing ring 35 is employed to form a seal between members 1 and 27.

Before assembly there is provided and located in the flare 11 of pipe 1 an infilling tubular bushing 37 of acorn shape which fills the otherwise space-forming socket 11. The inside diameter of the pipe 1 and that of the bushing 37 are preferably equal, to form a smooth passage. The bushing may be of any suitable material which is inert to the fluid being handled, such as metal, Teflon and the like.

The cover 27 forms an inlet passage 39 of cylindrical form, located opposite to and coaxial with the passage through the pipe 1 and bushing 37. A front wall 41 of member 21 has an opening 43, coaxial with the inlet opening 39, and around which is connected an outlet spout 45.

Spaced from opening 43 in wall 41 is a slot 47 for the reception of a swinging arm 49, pivoted at 51 to a projection 53 extending from the member 21. The arm 49 is provided beyond the pivot 51 with a threaded member 55 to which a handle 57 of suitable form is attached, so that the arm 49 may be rocked manually back and forth in the proper plane. The arm 49 and the handle 57, with the connection 55 therebetween, form a bell crank. The inner rounded end 59 of the arm 49 engages in a hole 61, located in a slide valve plate 63 which has straight-line movement. Part of the hole 61, which is in engaged by the rounded or ball end of the arm 49, is cylindrical, and part of it is conical, to permit the relative rocking movement of the arm 49. Operating pressure between the cylindrical form 61 and the ball end 59 obviates side thrust on valve 63. The valve 63 includes a port 65. The opposite faces 67 and 69 of the valve 63 are made smooth, flat and substantially parallel. Its opposite margins 71 are also flat and substantially parallel. As will be seen from FIGS. 3 and 4, a recess 94 is provided in the upper portion of the cup 21 at the inner end of the extension 53 for accommodating movement of the upper end of the slide valve 63. Preferably, the valve plate 63 is composed of a hard metal such as, for example, an alloy containing substantial amounts of tantalum and tungsten, which alloy is inert to liquids for which the faucet is intended.

At numeral 73 is shown a fixed circular valve seat nested in a recess 75 in the front wall 41. This has a central port 77 which registers with the opening 43. It also has a spaced upper slot 79 accommodating passage therethrough of the movable arm 49. Intersection of the arm 49 with the slot 79 prevents rotation of the fixed seat 73. The back of the seat 73 is grooved, as shown at 81. The groove 81 is of a width to act as a guide for the opposite parallel faces 71 of the slide valve 63. The front face 69 of the valve forms a flat engagement with the flat bottom of the groove 81. Thus the valve plate 63 has the stated straight-line movement. The entire seat 73 is preferably composed of a hard, wear-resistant nonmetallic material such as Teflon or other suitable inert plastic.

The rear flat face 67 of the slide valve 63 engages the flat face 83 of a floating valve seat 85. The latter is of disc form and also composed of an inert hard nonmetallic material such as Teflon. This seat is formed with a central cylindrical sleeve 87 through which and the disc 85 is formed a port 89. The sleeve 87 has a surrounding groove 91, for the reception of a resilient O-ring 93, having diameter (when undeformed) greater than the depth of the groove but smaller than its axial length. The sleeve 87 has a comparatively loose fit in the circular passage 39, the O-ring 93 under deformation forming a seal but permitting some rocking and axial floating movements of the seat 85. Surrounding the sleeve 87 is a wavy spring washer 95 which upon assembly becomes sandwiched and compressed between the disc 85 and the inner face of the cover plate 27.

From the above it will be seen that, upon assembly, the sleeve 87 of the seat 85 is telescoped in the passage 39, and that the spring washer 95 pushes together the parts 85, 63 and 73, the movable characteristic of the seat 85 assuring over-all face-to-face contact between the surfaces 67 and 83 on the one hand, and the surfaces 69 and 81 on the other hand, regardless of minor deviations from parallelism between faces 67 and 69 of the slide valve 63, such as can be expected in normal machining operations. Thus fluid is more positively excluded from the inner faces of the members 73, 63 and 85. Moreover, each pair of faces (67, 83) and (69, 81) is constituted by inert metallic and nonmetallic materials which are not as prone to bind interfacially as are like materials.

As above mentioned, the end of the arm 49 is preferably rounded or of the ball shape shown, so that engagement between it and the cylindrical portion of the hole 61 will obviate any substantial lateral thrusts which might otherwise tend to tilt the slide valve 63 and the floating seat 85 which it engages.

In the closed position of the valve, as shown in FIG. 2, the lever 57 has been flipped anticlockwise, which rapidly takes the port 65 out of register with the ports 89 and 77. When the lever 57 is flipped forward, as shown in FIG. 4, these ports 77, 65 and 89 are registered rapidly, to initiate flow. In the closed condition of the valve only a very small amount of beer (warmed and possibly foamed, due to standing) is trapped in the region of the bushing 37. The trapped volume can further be reduced by suitable dimensional changes. The quick start of flow ensues with minimum foam-out at the spout 45, thus allowing normal desirable foaming upon contact with the glass which receives the beer.

It is desirable to minimize the formation of obstructions in the passage of the liquid through the ports 77, 65 and 89. Under ideal conditions, this would be obtained by making the bores of the openings 77, 65 and 89 the same. However, ideal conditions of alignment of such passages are not usually attainable. Therefore, the passages 89, 65 and 77 are made successively larger. Thus passage 89 may be .234 inch in diameter, passage 65 may be made .250 inch in diameter, and passage 77 may be made .257 inch in diameter. Also, the port 43 and inside of the spout 45 may be made somewhat larger than port 77. This arrangement minimizes foaming due to eddying.

It will be noted that the construction is such that the groove 81 in the fixed valve seat 73 determines a plane of movement of the slide valve 63 which is parallel to the plane of movement of the bell crank constituted by the lever 49 and handle 57. The slot 79 in the fixed valve seat 73, which forms a fork around the lever 49, assures that the position of the valve seat 73 upon assembly will always be such as to bring about this relationship.

Since liquid is substantially wiped from the interfacial contacts between parts 73, 63 and 85 as the valve part 63 moves back and forth, little if any liquid is left between relatively moving surfaces to dry and bond them, which the action of the lever 49 might not be able to overcome without damage. In any event, any break-away of any lightly binding material does not resolve tearing of any soft seat material, which was the case with the old soft-surfaced spud type of valve.

Referring now more particularly to FIGS. 6–14, in which another form of the invention is illustrated, there is shown at numeral 101 a one-piece housing having an integral outlet spout 103, an integral threaded inlet fitting 105 and an integral projection forming a linkage support 107, the latter being located over the spout 103. The support 107 has parallel side walls 108, the forward portions of which terminate in an open slot 110. The inlet fitting 105 is formed with opposite inside shoulders 109 and 111 forming pockets 113 and 115, respectively, connected by a passage 117. There is also a pocket 119 formed in the body 101. This pocket communicates at its upper end with a space 121 between the walls 108. Space 121 terminates in the open slot 110. The entire housing 101 is formed in one piece, preferably by molding from plastic, or alternatively by casting from metal. Before assembly of additional parts within housing 101, the lower portion of the pocket 119 will be open but adapted later to be closed by a lower cap 123 which, after being telescoped into position, is held in place by a suitable adhesive such as an epoxy resin. These arrangements are described below.

The inlet end of the pocket 113 is internally splined as shown at 125 for the reception of the conjugately splined end 127 of a pipe 129. Within the pocket 113 is an O-ring 131 upon which the flat end of pipe 129 may seat. The pipe 129 is grooved, as shown at 133, for the reception of a shoulder-forming snap ring 135 against which slides a flanged sleeve 137. Sleeve 137 is adapted to be drawn up against the ring 135 by a nut 139 when the latter is threaded on the threaded inlet fitting 105. This drives the flat end of the pipe 129 against the O-ring 131. The interior of the pipe 129 consists of a straight cylindrical passage 130 reaching to its flat inner end.

At 141 is shown a rectangular valve seat in which is an outlet opening 143. The seat 141 is preferably composed of a hard tantalum-tungsten metal alloy having an accurately flat-lapped rear surface exposed in the space 119. This seat 141 is located in a slot 145 in the front part of the body 101 and is affixed therein by means of a suitable adhesive such as epoxy resin. The seat 141 is emplaced and adhered prior to application of the cap 123.

At 147 is shown a rectangular slide valve plate in which is an opening 149 adapted to be placed into and out of register with the opening 143. It also has an opening 151 for the reception of the ball-end 153 of an operating lever 155. The slide valve plate 147 is also preferably composed of a hard tantalum-tungsten metal alloy. Its front face is also flat-lapped for accurate engagement with the rear face of the fixed valve seat 141. The valve plate 147 is slidable in a grooved formation 157 on the front side of a ring or disc or carrier 159, in which is a stepped opening 160. The disc is axially movable in a semicircularly recessed part 161 in front of the shoulder 111. A wavy spring washer 163 backs the disc or carrier 159 in the recess 161, a three-wave washer being preferable. Adhered by an epoxy resin in a pocket 165 at the bottom of the groove 157 in disc 159 is a valve seat 167 in which is an inlet opening 169. The seat 167 is composed of hard tantalum-tungsten alloy, the front face of which is flat-lapped for engagement with the rear face of the slide valve plate 147. Since the disc 159 is axially movable, so is the valve seat 167 affixed thereto. The rear face of the slide valve 147 is also flat-lapped.

In view of the above, it will be apparent that both the front and rear faces of the slide valve plate 147, the front of seat 167, and the rear surface of seat 141 are all flat-lapped. The flat-lapping is preferably accomplished to an accuracy corresponding to less than a wave length of light, that is, so that liquid cannot be accommodated between contacting surfaces, whether the openings 143, 149 and 169 are in or out of register. The openings 143 and 169 are coaxial, whereas the opening 149 may move into register as shown in FIG. 9, or out of register as shown in FIGS. 8 and 11.

Attached to the rear side of the ring-shaped disc 159 is a tubular stem member 171 having a stepped end 172, affixation being accomplished by means of an epoxy resin between the stepped hole 160 and the stepped end 172. This tubular member 171 has formed at its rear end a thin flexible flange or diaphragm 173 the periphery of which is squeezed on shoulder 109 by the O-ring 131 when the nut 139 is drawn up. Flexibility of the diaphragm 173 is inherent because of its thinness and the fact that it and its integral tube 171 are preferably composed of a plastic material which is springy in thin sections.

The purpose of constructing the assembly of the ring 159 and of the tube 171 in two parts is to permit assembly of parts in the one-piece housing 101. Thus with the cap 123 removed, the front seat 141 is first inserted in slot 145 and bonded therein. Originally the disc 159 and the tube 171 are separate when outside of the body 101. While thus outside, the rear seat 167 is emplaced in pocket 157 and bonded therein. Then the slide valve plate 147, the disc 159 and spring washer 163 may be inserted from below (compare their dot-dash and solid-line positions in FIG. 9). Next the cap 123 is applied from below and adhered by application of an epoxy resin. When in place, a lip 199 on the cap 123 engages the lower end of the front seat 141 to assure its support. A second lip 201 on the cap 123 aligns with the bottom of the disc 159 so as to assure its support but without interfering with its axially floating condition in the circularly recessed part 161 of the body 101. Arrows in FIG. 9 show how the assembly of parts 147, 159, 163 and the cap 123 are moved into place.

Next, assuming that the pipe 129 and nut 139 have not yet been attached to the inlet fitting 105, the flanged tube 171 is brought in from the rear of the inlet (compare their dot-dash and solid-line positions in FIG. 9) adhesive having been applied at 160 and 172. The arrows show the direction of movement for assembly. Then the O-ring 131 and the knurled end 127 of the tube 129 are inserted in pocket 113 and the nut 139 screwed home. As thus assembled, the immovable O-ring 131 clamps the margin of the flexible diaphragm 173 on the shoulder 109. The tube 171 becomes attached to the disc 159. The spring-pressed disc 159 biases the rear movable seat 167 so that the slide valve plate 147 is squeezed between this movable seat 167 and the fixed seat 141. Liquid pressure on the diaphragm 173 produces an additional squeezing effect. These effects, taken in connection with the flat-lapped close fit between the sliding surfaces, assures that no liquid will escape into the space 119. No liquid can escape into the passage 117 because of the sealing effect of the squeezed O-ring 131 on the edge of diaphragm 173.

The holes through the pipe 129, tube 171, disc 159, slide valve plate 147 and valve seats 141 and 167 are all substantially equal, thus assuring a comparatively smooth flow of fluid. The passage 177 through the spout 103 is also of about the same size where it connects with the port 143 of the front seat 141. This opening 177 flares in the direction of the exit end of the spout 103.

Pivoted between the side walls 108 at 179 is the lever 155, at the rear of which is the ball 153 in opening 151, for operating the slide valve plate 147. The front end of lever 155 extends out of the opening 110, where it is forked as shown at 181 for the reception of a cross pin 183 which extends across a socket 185 formed at the outer end of a second lever 187. Lever 187 is pivoted between the side walls 108 at a pivot 189 and has a slot 191 through which extends a pin 193 supported between the side walls 108. Pin 193 limits movements of the lever 187. An upwardly extending operating handle 195 is connected with the outer end of lever 187 by a suitable attachment 197. By flipping the handle 195 backward, the lever 187 is rotated clockwise (FIG. 8). Thus the slot and pin connection 181, 183 rotates the lever 181 clockwise. This forces down the slide valve plate 147 to take its port 149 out of registry with the ports 143 and 169 in the valve seats. As shown in FIG. 8, when the handle 195 is flipped forward, the reverse action occurs, whereby the slide valve plate 147 is lifted to place these ports 143, 149, 169 in registry, as shown in FIG. 9.

Both forms of the invention have a structural advantage in that the operating linkage for the slide valve in each case is rotated above the curved spout of the faucet and is movable in its vertical plane. The linkage of the form of the invention shown in FIGS. 6–14 has an additional advantage in that it is of the compound variety, which reduces the amount of its overhang with respect to the spout, allowing the spout to extend beyond it.

Both forms also have the advantage of compactness of form in that the spring which backs the movable disc which carries the movable seat is biased by the annular spring washer of wave form. This simplifies the means for biasing together the seats and slide valve and considerably shortens the overall length of the faucet as compared to what it would be by the use of conventional coil springs.

The particular form of the invention shown in FIGS. 6–14 has several important advantages, as follows: The seal at the O-ring 131 is nonmoving and positive under compressive action from the nut 139. The flexibility of the diaphragm 173 permits spring washer 163 to push forward the disc 159 (with seat 167 and tube 171), thereby squeezing slide valve plate 147 between seats 141 and 167 but allowing for its movement. The various parts of the body 101 which connect the opening 177, the walls 108, the central portion containing the valve parts and the rear threaded portion 105, are all integral and may therefore be economically molded without requiring later assembly of separate body parts. Once the faucet has been assembled with the cap 123 in place, cleaning may be effected without disassembly and simply by flushing with a cleaning liquid. No liquid leaks into spaces 117 or 119. In fact, disassembly of the parts in the body is discouraged by its integral form.

The compound linkage 187, 179 for transmitting motion from the handle 195 to the slide valve 147 is advantageous in that it is a compact means by which a rapid and substantial valve movement can be obtained when the lever 195 is flipped from one limiting position to another.

The faucet is very sanitary because there is no leakage of fluid into the spaces 117 or 119. This is due to the tight seal afforded by the O-ring 131 and the excellent sealing effect afforded by the spring-loaded engaging flap-lapped surfaces between the slide valve 147 and its seats 141 and 167.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A faucet comprising a hollow body having a downstream outlet and an upstream inlet, an outlet seat, a movable carrier in the body, an inlet seat located on the carrier, a hollow inlet stem connected with said carrier, a flexible diaphragm extending from said stem, means immovably sealing the margin of the flexible diaphragm to the body, a valve plate in the hollow body movable between said seats, and means carried by the body adapted to operate said valve plate.

2. A faucet according to claim 1, including an annular spring washer located to react between the body and carrier.

3. A faucet comprising a hollow body, a downstream spout extending therefrom, an upstream inlet member forming inward spaced shoulders, a first one of said shoulders forming a socket communicating with the interior of the hollow body, a fixed seat in the housing, a movable carrier in the socket, a seat on the carrier, a spring in said socket reacting between the body and the carrier, a hollow stem connected with said carrier, a flexible diaphragm extending from said stem and engaging the second shoulder, means immovably sealing the margin of the flexible diaphragm to the second shoulder, a valve plate in the hollow body movable between said seats, and means carried by the body adapted to operate said valve plate.

4. A faucet comprising a hollow body, a downstream spout extending therefrom, an upstream inlet member forming inward spaced shoulders, a first one of said shoulders forming a socket communicating with the interior of the hollow body, an immovable front seat in the housing, a movable carrier in the socket, a seat on the carrier, a wavy annular spring washer in said socket reacting between the body and the carrier, a hollow stem connected with said carrier, a flexible diaphragm extending from said stem and engaging the second shoulder, means immovably sealing the margin of the flexible diaphragm to the body, a valve plate in the hollow body movable between said seats, and lever means carried by the body adapted to operate said valve plate.

5. A faucet comprising a body having a portion forming a recess, a forward integral downwardly curved spout extending therefrom, a rearward integral inlet member having spaced shoulders, a first one of which shoulders forms a space communicating with said recess, the second one of which shoulders forms a socket in the inlet member, a fixed front seat in the housing, a movable disc in the space formed by the first shoulder, a spring washer in said space reacting between the disc and the body, a hollow stem connected with said disc, a flexible diaphragm extending from said stem and engaging the second shoulder, means fixedly sealing the margin of the diaphragm to the body on the last-named shoulder, a second valve seat carried by the disc and movable therewith, a valve plate movable between said seats, and operating means for said valve plate carried by the body.

6. A faucet according to claim 5, wherein said body carries integral spaced walls above the spout, and wherein said operating means comprises a first lever pivoted between said walls and operatively connected with said valve plate, and a second lever pivoted between said walls and operatively connected with said first lever, said second lever carrying an operating handle.

7. A faucet according to claim 5, wherein said recess in the housing has an inlet opening for the reception of said disc, seats and valve plate, and a closure cap for said opening, said stem with its diaphragm forming a separate portion attachable to said disc by insertion through said inlet opening after the disc, seats and valve plate have been inserted in said recess.

References Cited by the Examiner

UNITED STATES PATENTS

| | | | |
|---|---|---|---|
| 1,149,892 | 8/15 | Blattner | 251—195 XR |
| 1,752,456 | 4/30 | Pillatt | 251—176 |
| 2,136,940 | 11/38 | Ehbrecht | 222—505 XR |
| 2,170,574 | 8/39 | Sauzedde | 285—109 XR |
| 2,543,311 | 2/51 | Augspurger et al. | 285—101 |
| 2,548,128 | 4/51 | Snyder | 251—174 |
| 2,605,994 | 8/52 | Borchardt | 251—174 |
| 2,718,372 | 9/55 | Broz | 251—174 |
| 2,732,170 | 1/56 | Shand | 251—174 XR |
| 2,882,009 | 4/59 | Bryant | 251—174 XR |

FOREIGN PATENTS

| | | |
|---|---|---|
| 507,775 | 12/51 | Belgium. |
| 1,293 | 1864 | Great Britain. |
| 406,391 | 3/34 | Great Britain. |
| 445,847 | 2/49 | Italy. |

LAVERNE D. GEIGER, *Primary Examiner.*

MARTIN P. SCHWADRON, *Examiner.*